United States Patent Office 3,770,703
Patented Nov. 6, 1973

3,770,703
HEAT HARDENABLE MIXTURES OF ε-CAPROLACTAM BLOCKED POLYISOCYANATES AND CYCLOALIPHATIC POLYAMINES
Hermann Gruber, Leverkusen, and Eberhard Degener, Opladen, Germany, assignors to Bayer Aktiengesellschaft, Leverkusen, Germany
No Drawing. Filed June 14, 1972, Ser. No. 262,915
Claims priority, application Germany, June 24, 1971,
P 21 31 299.2
Int. Cl. C08g 22/32
U.S. Cl. 260—77.5 TB          7 Claims

ABSTRACT OF THE DISCLOSURE

Heat cross-linkable compositions are provided which are a mixture of a cycloaliphatic polyamine and a ε-caprolactam blocked polyisocyanate compound. The compositions are suitable in the production of sheet structures and molded articles.

HEAT HARDENABLE MIXTURES

This invention relates to mixtures of blocked polyisocyanates with polyamines and more particularly to mixtures of blocked polyisocyanates with polyamines which are heat-hardenable.

It is known that the reactivity of polyisocyanates can be controlled with so-called blocking agents. The substances used as blocking agents are chemical compounds which contain reactive hydrogen atoms which may be split-off at temperatures of from about 100° C. to about 200° C. The blocking agents commonly used in practice are phenols or cresols, which decompose at temperatures of between about 160° C. and about 180° C.

Blocked polyisocyanates are widely used in the lacquer industry, for example, in the production of heavy-duty wire lacquers. One typical formulation of a blocked polyisocyanate is the reaction product of aprepolymer of about 1 mol of trimethylol propane and about 3 mols of tolylene diisocyanate with about 3 mols of phenol.

It is also known that phenol blocked polyisocyanates, react with the hydrogen atoms of amino groups. In this reaction, the blocking agent is displaced and polyureas are formed which have very valuable properties particularly in their mechanical and chemical resistance. With isocyanates as such, polyamines react almost explosively if they contain reactive primary and/or secondary amino groups. Polyisocyanates masked with phenol harden within a few minutes at room temperature if they are mixed with polyamines which contain more than two active hydrogen atoms attached to the nitrogen atoms of the amine. W. Götze has described this reaction in Schweizer Archiv für angewandte Wissenschaft and Technik 26, 311 (1960) wherein the above-mentioned phenol-blocked polyisocyanate prepolymers were reacted with polyaminoamides based on dimerized linoleic fatty acid. This process, however, has not proved practically useful because of the extremely short time available for working up.

It is furthermore known to prepare hardenable mixtures containing ε-caprolactam-blocked polyisocyanates with aliphatic primary or secondary polyamines as described in, for example, U.S. Pat. No. 3,245,961. However, a disadvantage of the systems disclosed in this patent is that shaped products prepared from such mixtures exhibit a relatively poor structural strength and have tacky surfaces.

It is therefore an object of this invention to provide hardenable mixtures devoid of the foregoing disadvantages. Another object of this invention is to provide hardenable mixtures useful for the production of shaped articles. A further object of this invention is to provide mixtures of blocked polyisocyanates with polyamines. An additional object of this invention is to provide mixtures of blocked polyisocyanates with polyamines which are stable, i.e., non-reactive, at room temperature. Yet another object of this invention is to provide mixtures of blocked polyisocyanates with polyamines which are hardenable at moderately elevated temperatures.

The foregoing objects and others which will become apparent from the following description are accomplished in accordance with the invention generally speaking by providing mixtures comprising a polyisocyanate compound, the isocyanate groups of which are blocked with ε-caprolactam with a cycloaliphatic amino compound which contains at least two hydrogen atoms attached to the nitrogen of the amino groups. Such mixtures are stable, i.e., they will not harden, at room temperature but will harden only at elevated temperatures, i.e., at temperatures of from about 100° C. to about 250° C.

This invention therefore relates to mixtures which are hardened by heating which mixtures are useful in the production of shaped products, including sheet structures, which mixtures comprise a compound containing ε-caprolactam-blocked polyisocyanate groups in combination with a hardener which may be either a cycloaliphatic primary or secondary polyamine which contains at least two hydrogen atoms attached to amino nitrogen or a compound which can be converted into such a polyamine by atmospheric moisture.

The polyisocyanates blocked with ε-caprolactam which are used according to the invention are prepared in a known manner by reacting a polyisocyanate with an equimolar quantity of ε-caprolactam. In order to obtain better control over the reaction, which is generally carried out at elevated temperatures of from about 60° C. to about 120° C., the ε-caprolactam may be used in an excess of, for example, 20% over the equimolar ratio. The knowledge available from polyurethane chemistry about the catalysis of NCO groups with compounds which contain active hydrogen atoms may be usefully applied here. The isocyanates which are to be converted into masked or blocked isocyanates may be any aliphatic, cycloaliphatic, araliphatic or aromatic polyisocyanates, such as, for example, hexamethylene - 1,6 - diisocyanate, 1-isocyanato-3,3,5 - trimethyl - 5 - isocyanatomethylcyclohexane, tolylene-2,4- and -2,6-diisocyanate and any mixtures of these isomers, diphenylmethane-4,4'-diisocyanate, dicyclohexylmethane-4,4'-diisocyanate and the like. The most suitable isocyanates for masking with ε-caprolactam followed by hardening with polyamines, however, are higher molecular weight compounds containing free isocyanate groups of the type which are obtained when higher molecular weight polymerization or polycondensation products, which contain hydrogen atoms which are reactive with isocyanate groups, are reacted with an excess amount of a diisocyanate or polyisocyanate, i.e., an amount corresponding to an NCO:OH ratio of from about 1.5:1 to about 2.5:1, or with a large excess of a diisocyanate or polyisocyanate, the excess isocyanate being subsequently removed, such as, for example, by thin layer distillation.

These prepolymers which contain terminal isocyanate groups may be prepared from any polymerization or polycondensation products which contain hydroxyl or sulphhydryl groups and which have a molecular weight of from about 150 to about 10,000, preferably from about 1,000 to about 5,000. Examples of such products are the polyether polyols well known in polyurethane chemistry, which may be obtained by polymerization, copolymerization or block copolymerization of alkylene oxides such as ethylene oxide, propylene oxide and/or butylene oxide, using bifunctional or polyfunctional starter molecules which contain active hydrogen atoms, such as, for example, water, ammonia, ethylene diamine, ethylene glycol, trimethylolpropane, glycerol, pentaerythritol, sorbitol, phosphorous acid, phosphonic acids and the like. Polythioether polyols which may be prepared, for example, by a polycondensation reaction of thiodiglycol either with itself or with diols and/or polyols of the type mentioned above are also suitable for preparing these prepolymers having terminal NCO-groups. Other compounds suitable for preparing these prepolymers include polyacetals, for example, the polycondensation products of formaldehyde and diols or polyols of the type mentioned above, which may be prepared using acid catalysts such as phosphoric acid or p-toluene sulphonic acid.

The above-mentioned polymerization and polycondensation products are reacted with diisocyanates and/or polyisocyanates in known manner to produce so-called isocyanate prepolymers which contain free isocyanate groups.

If a certain amount of additional chain-lengthening via the formation of urethane groups is acceptable or desired, the reaction between the polymerization or polycondensation products which contain hydroxyl groups and the diisocyanates or polyisocyanates is carried out using an NCO:OH ratio of from about 1.5:1 to about 2.5:1, preferably from about 1.8:1 to about 2.2:1. This reaction may first be carried out from about 0° C. to about 25° C. with cooling and later, if necessary, for several hours, with heating, preferably to from about 50° C. to about 120° C. If a chain-lengthening reaction is not desirable, a much larger excess of diisocyanate or polyisocyanate is used, preferably one corresponding to an NCO:OH ratio of from about 3:1 to about 5:1 which reaction is otherwise carried out under the same conditions as the one carried out with low NCO:OH ratios, and the excess diisocyanate or polyisocyanate is removed, for example, by thin layer distillation in the case of diisocyanates or polyisocyanates which are capable of being distilled or by solvent extraction if the isocyanates cannot be distilled.

The following are some examples of suitable diisocyanates or polyisocyanates used in the preparation of the prepolymers: tolylene-2, 4-diisocyanate and commercial mixtures of this diisocyanate with tolylene-2,6-diisocyanate;
tolylene-2,6-diisocyanate;
diphenylmethane-4,4'-diisocyanate;
hexamethylene-1,6-diisocyanate;
naphthylene-1,5-diisocyanate;
m-xylylene diisocyanate;
1-methyl-2,4-diisocyanato-cyclohexane;
1-isocyanato-3,3,5-trimethyl-5-isocyanato-methyl cyclohexane;
2,4,4-trimethyl-1,6-diisocyanatohexane;
dimeric tolylene-2,4-diisocyanate;
N,N'-di(4-methyl-3-isocyanatophenyl) urea;
N,N',N"-tri-(6-isocyanatohexyl) biuret;
triphenylmethane-4,4',4"-triisocyanate;

the reaction product of 3 mols of tolylene-2,4-diisocyanate and 1 mol of 1,1,1-trimethylolpropane; trimerization and polymerization products of tolylene-2,4-diisocyanate; cotrimerization and copolymerization products of tolylene-2,4-diisocyanate; cotrimerization and copolymerization products of tolylene-2,4-diisocyanate and hexamethylene-1,6-diisocyanate; mixtures of isomeric diphenylmethane diisocyanates; polyisocyanates which contain more than two benzene rings each linked through methylene groups, and diisocyanates which have a diphenylmethane structure in which the isocyanate groups are partly converted into carbodiimide groups.

The preparation of the polymerization and polycondensation products which contain isocyanate groups may be carried out either solvent-free or in solvents which are inert to isocyanates. After the reaction is complete, any solvent, if used, is removed, preferably by thin layer distillation. In some cases, however, it may be preferable to use the solutions of isocyanate prepolymers as such.

Some suitable solvents are, for example, esters such as ethyl acetate, butyl acetate, methyl glycol acetate and ethyl glycol acetate, ketones such as methyl ethyl ketone and methyl isobutyl ketone, aromatic solvents such as toluene and xylene and higher aromatic solvent mixtures, and mixtures of any of the above-mentioned solvents.

The preparation of the bifunctional and polyfunctional polymerization products which contain isocyanate groups may, if desired, be carried out in the presence of hydroxyl-containing chain-lengthening agents conventionally used for reactions by the isocyanate polyaddition process. Polyfunctional chain-lengthening agents, for example, are capable not only of entering into a chain-lengthening reaction but also of causing polymerization and polycondensation products which on their own are only bifunctional to be branched via urethane groups. The increased urethane group content which can be obtained using chain-lengthening agents may, if desired, be used for increasing the viscosity of the isocyanate prepolymers or their solutions.

The chain-lengthening agents used are preferably hydroxyl-containing compounds such as, for example, butane-1,4-diol, 1,1,1-trimethylolpropane and hydroquinone-di-(2-hydroxy-ethyl ether) and the like.

Suitable catalysts are, for example, diazobicyclooctane, dibutyltin dilaurate and tin-(II) octoate, used in quantities of from about 0.01% to about 2% by weight based on the weight of reaction mixture.

The polymerization or polycondensation products containing isocyanate groups may be prepared from the above-mentioned components are then reacted in known manner with ε-caprolactam, preferably in stoichiometric quantities, to produce caprolactam adducts. This reaction is advantageously carried out at elevated temperatures, preferably at from about 50° C. to about 120° C., and if desired with the catalysts commonly used in isocyanate chemistry, for example, tertiary amines and/or compounds of divalent or tetravalent tin.

In the compounds according to the invention, the polyisocyanates blocked with ε-caprolactam are present in combination with cycloaliphatic amino compounds which contain at least two hydrogen atoms attached to amino nitrogen or in combination with compounds from which these amines are readily formed by hydrolysis with atmospheric moisture. The proportions in which these components are present in the mixtures according to the invention are so selected that from about 0.5 to about 2.0 and preferably from about 0.8 to about 1.6 primary or secondary amino groups or groups which are converted into such amino groups by reaction with atmospheric moisture are present for each blocked isocyanate group.

Polyamines which are particularly preferred are those which have one or more cycloaliphatic rings, some examples of which are:

1-cyclohexylamino-3-aminopropane;
1,4-diaminocyclohexane;
1,3-diaminocyclopentane;
di-(aminocyclohexyl) methane;
di-(aminocyclohexyl) sulphone;
1,3-di-(aminocyclohexyl) propane;
4-isopropyl-1,2-diaminocyclohexane;
2,4-diaminocyclohexane;
N,N'-diethyl-1,4-diaminocyclohexane;
3,3'-dimethyl-4,4'-diaminodicyclohexylmethane;
3-aminomethyl-3,3,5-trimethyl-cyclohexylamine and the like. Diprimary cycloaliphatic amines are particularly suitable for the mixtures prepared according to the invention.

Compounds which split off amines may also be used as hardeners, particularly the condensation products of the primary polyamines described above with aliphatic, cycloaliphatic, araliphatic or aromatic ketones. They may be prepared, for example, by continuously removing the water of condensation from the reaction mixture by azeotropic distillation. Ketimines of this kind are readily split into the corresponding polyamine and ketone by the hydrolytic action of atmospheric moisture.

The mixtures according to the invention generally contain from about 10 to about 100 percent by weight, preferably from about 50 to 100 percent by weight, of the combination of blocked polyisocyanate and polyamine. In addition to these essential components, the mixtures according to the invention may also contain the usual modifying agents such as extenders, fillers and/or reinforcing substances, pigments, solvents, plasticizers, levelling agents, thixotropic agents, flame-retarding substances, mold parting agents and the like. The following are examples of suitable extenders, reinforcing substances, fillers and pigments which may be used in the mixtures: coal tar, bitumen, textile fibres, glass fibres, asbestos fibres, boron fibres, carbon fibres, cellulose, polyethylene powder, quartz powder, mineral silicates such as mica, asbestos powder, ground shale, kaolin, aluminum hydroxide, powdered chalk, gypsum, antimony trioxide, bentonites, silica aerogel, lithopone, heavy spar, titanium dioxide, carbon black, graphite, oxide pigments such as iron oxide or metal powders such as aluminum powder or iron powder.

Suitable solvents for the modification of the hardenable mixtures are, for example, toluene, xylene, n-propanol, butylacetate, acetone, methyl ethyl ketone, diacetone alcohol, ethylene glycol monomethyl ether, ethylene glycol monoethyl ether, ethylene glycol monobutyl ether and the like.

Suitable plasticizers for modifying the hardenable mixtures are, for example, dibutyl-, dioctyl- and dinonyl-phthalate, tricresyl phosphate, trixylenyl phosphate polypropylene glycols and the like.

The levelling agents which may be added to the hardenable mixtures, especially if they are to be used for surface protection, include for example, silicones, cellulose acetobutyrate, polyvinyl butyrate, waxes, stearates and the like.

The hardenable mixtures may be prepared by the usual methods using known mixing apparatus such as, for example, stirrers, kneaders, rollers and the like.

Hardening the mixtures according to the invention is preferably carried out by heating them to temperatures in the region of from about 100° C. to about 250° C., preferably to from about 130° C. to about 200° C., for a period of from about 10 to about 120 minutes, preferably from about 20 to about 60 minutes.

The mixture according to the invention are suitable for the production of shaped products including sheet structures or the like produced by casting or extrusion, laminates, lacquer films, bonds and the like.

This invention therefore also relates to a process for the production of shaped products, including sheet structures, in which mixtures containing (a) a ε-caprolactam-blocked compound containing isocyanate groups and
(b) a cycloaliphatic primary or secondary polyamine which contains at least two hyrogen atoms attached to amino nitrogen are shaped by a hardening process in the heat.

In the process according to the invention, the mixtures according to the invention may be made up in various formulations adapted to their particular use, either with or without fillers and if desired in the form of solutions, for use as paints, molding compositions, dip molding resins, casting resins, adhesives and cementing and grouting compositions. If desired, textile fabrics or glass fibre mats may be embedded in the composition. The heat hardenable systems may be applied by various methods according to their formulation, including painting, injection molding, dip molding, casting, spraying or application with a coating knife.

In the process according to the invention, hardening may be carried out in two stages if desired. In that case, the hardening reaction is either stopped before it is completed or carried out at an only slightly elevated temperature so that a hardenable precondensate which is still fusible and soluble is obtained (so-called "B-stage"). Such a precondensate is generally quite stable in storage and may be used, for example, in the preparation of "prepreg" molding compositions and the like.

The mixtures according to the invention are stable at room temperature and harden at elevated temperatures within a short time. They can therefore be adapted to continuous injection molding, dip molding or spray processes. The hardened products of the process have excellent mechanical properties.

The invention is further illustrated although it is not intended that it be limited by the following examples in which all parts and percentages are by weight unless otherwise specified.

EXAMPLES

Example 1

About 2000 parts of a polypropylene glycol (OH Number 48) prepared by anionic polymerization of propylene oxide with 1,1,1-trimethylolpropane are mixed with about 240 parts of tolylene-2,4-diisocyanate at from about 20° C. to about 25° C. The mixture is then heated to about 70° C. with stirring for about 5 hours, at the end of which time it has an NCO-content of about 2.85%. After cooling to about 20° C. to about 25° C., about 2 parts of tin-II octoate and about 191 parts of ε-caprolactam are added. The mixture is then heated to about 60° C. with stirring for about 10 hours.

The product has no detectable NCO-content. The equivalent weight is about 1590 and the viscosity is about 65,000 centipoises at 20° C.

About 90 parts of 3,3'-dimethyl-4,4'-diamino-dicyclohexylmethane are added to about 1000 parts of the ε-caprolactam-blocked isocyanate prepolymer described above. About 500 parts of the mixture are stored in a sealed vessel at about 40° C. to test its stability in storage.

Viscosity at the beginning of the test: 36,500 cp./20° C.
Viscosity after 4 weeks' storage at 40° C.: 37,800 cp./20° C.

This illustrates that the mixture is sufficiently stable in storage at low temperatures.

About another 500 parts of the mixture are poured into molds measuring 200 x 200 x 4 mm and heated to about 140° C. for about 60 minutes. An elastic synthetic resin having the following properties is obtained on cooling:

Shore Hardness A (DIN 53 505) _____ 70
Tensile strength (DIN 53 504), kg./cm.² _____ 40
Elongation at break (DIN 53 504), percent _____ 350
Tear propagation resistance (DIN 53 515), kg./cm. _____ 19

Example 2

About 3000 parts of a trifunctional polypropylene glycol (OH Number 48) prepared by anionic polymerization of propylene oxide with 1,1,1-trimethylolpropane are heated with about 1400 parts of tolylene-2,4-diisocyanate to about 70° C. for about 5 hours with stirring. Excess tolylene diisocyanate is then removed by thin layer distillation under vacuum. A prepolymer which contains terminal isocyanate groups and has an NCO-content of about 3.4% is obtained. About 200 parts of ε-caprolactam are added to about 2000 parts of this prepolymer at about 40° C. with stirring in a stream of dry nitrogen. The reaction mixture is heated to about 90° C. and stirred at this temperature until no isocyanate is detected in the product. The product has a calculated equivalent weight of about 1359 and a viscosity of about 52,000 cp. at 20° C.

About 1000 parts of the product prepared as described above are mixed with about 100 parts of 3,3'-dimethyl-4,4'-diaminodicyclohexylmethane, about 385 parts of xylene, about 200 parts of barium sulphate, about 100 parts of calcium carbonate, about 300 parts of chromium oxide and about 15 parts of bentonite and are homogenized in a roll mill. The homogenized mixture are sprayed on iron sheets with an airless spray apparatus. Elastic coatings firmly bonded to the sheets are obtained after a heat treatment at about 160° C. for about 30 minutes.

Example 3

About 154 parts of ε-caprolactam are added to about 1000 parts of about a 60% solution of a prepolymer of about 8 mols of tolylene diisocyanate, about 2 mols of trimethylolpropane, about 1 mol of butylene glycol and about 1 mol of a polypropylene glycol having a molecular weight of about 1000 in a solvent mixture of equal parts of xylene and ethyl glycol acetate. The mixture is stirred at about 90° C. for about 6 hours, at the end of which time the product no longer contains any free isocyanate. The approximately 65% solution of the masked isocyanate compound has an equivalent weight (calculated) of about 931 and a viscosity of about 26,300 cp. at 20° C.

About 100 parts of the product prepared as described above are mixed with about 30 parts of ethyl glycol acetate and about 10 parts of 3,3'-dimethyl-4,4'-diamino-cyclohexylmethane. This solution is poured out on glass plates and heated to about 160° C. for about 60 minutes to bring about cross-linking. Glossy films are obtained which are insoluble in toluene, ethanol and ethyl acetate, have high adhesive strength and are distinguished by their high elasticity combined with high hardness.

Pendulum hardness according to Albert König (DIN 53 157), sec. _____ 202
Elasticity according to Erichsen (DIN 53 156), mm. _____ 10.8
Depth of cupping on impact (DIN 53 156), mm. __ 1.7
Abrasion acording to Taber (DIN 53 754) (1000 revolutions/1 kg. load), mg. _____ 7.6

Although the invention is described in considerable detail in the foregoing examples, it is to be understood that such examples are intended solely for purposes of illustration and that many variations can be made by those skilled in the art without departing from the spirit and scope of the invention.

What is claimed is:

1. A heat cross-linkable composition comprising a compound containing terminal NCO groups, which NCO groups are blocked with ε-caprolactam and a cycloaliphatic primary or secondary polyamine.

2. The composition of claim 1 wherein the polyamine is a diprimary cycloaliphatic diamine.

3. The composition of claim 2 wherein the polyamine is 3,3'-dimethyl-4,4'-diamino-cyclohexylmethane.

4. The composition of claim 1 wherein the proportion of polyamine is such that from about 0.5 to 2.0 amino groups are present for each blocked isocyanate group.

5. The composition of claim 1 wherein the polyamine is the condensation product of a cycloaliphatic primary polyamine with an aliphatic, cycloaliphatic, araliphatic or aromatic ketone.

6. Sheet structures prepared by casting the composition of claim 1 onto a substrate and heating the coated substrate to a temperature of from about 100° C. to about 250° C. for from about 10 minutes to about 120 minutes.

7. Molded articles prepared by casting the composition of claim 1 into a suitable mold followed by heating to a temperature of from about 100° C. to about 250° C. for from about 10 minutes to about 120 minutes.

References Cited
UNITED STATES PATENTS 3,245,961   4/1966   Fetscher et al. __ 260—33.8 UB
3,621,000   11/1971  Schmelzer et al. __ 260—77.5 TB MAURICE J. WELSH, Primary Examiner U.S. Cl. X.R.

252—182, 188.3; 260—859 R